United States Patent [19]

Smith

[11] Patent Number: 5,696,932

[45] Date of Patent: Dec. 9, 1997

[54] METHOD AND SYSTEM FOR ESTIMATING MINUMUN REQUIREMENTS ON A CACHE IN A COMPUTER BASED STORAGE SYSTEM

[75] Inventor: Kevin Frank Smith, San Jose, Calif.

[73] Assignee: International Business Machines Corporation, Armonk, N.Y.

[21] Appl. No.: 441,851

[22] Filed: May 16, 1995

[51] Int. Cl.$^6$ ............................................. G06F 11/34
[52] U.S. Cl. ........................ 395/445; 395/460; 395/462
[58] Field of Search ............................... 395/456, 463, 395/471, 472, 486, 487, 497.01, 497.02, 497.03, 497.04, 460, 462, 445

[56] References Cited

U.S. PATENT DOCUMENTS

| | | | |
|---|---|---|---|
| 4,371,929 | 2/1983 | Brann et al. | 395/865 |
| 4,463,424 | 7/1984 | Mattson et al. | 395/463 |
| 4,669,043 | 5/1987 | Kaplinsky | 395/403 |
| 4,780,808 | 10/1988 | Moreno et al. | 395/800 |
| 4,905,141 | 2/1990 | Brenza | 395/456 |
| 4,945,512 | 7/1990 | DeKarske et al. | 365/49 |
| 5,117,350 | 5/1992 | Parrish et al. | 395/401 |
| 5,247,648 | 9/1993 | Watkins et al. | 395/470 |
| 5,287,482 | 2/1994 | Arimilli et al. | 395/457 |
| 5,293,608 | 3/1994 | Johnson et al. | 395/463 |
| 5,293,609 | 3/1994 | Shih et al. | 395/464 |
| 5,353,430 | 10/1994 | Lautzenheiser | 395/444 |
| 5,357,623 | 10/1994 | Megory-Cohen | 395/456 |
| 5,394,531 | 2/1995 | Smith | 395/463 |
| 5,539,894 | 7/1996 | Webber | 395/445 |
| 5,542,066 | 7/1996 | Mattson et al. | 395/463 |

OTHER PUBLICATIONS

Computer Architecture A Quantitative Approach, D.A. Patterson & J.L Hennessy; pp. 408–425.
IEEE Transactons On Software Engineering., vol. 18 No. 1, Jan. 1992; 0098-5589/92S03.00.

*Primary Examiner*—David L. Robertson
*Attorney, Agent, or Firm*—Benman Collins & Sawyer; Esther Klein

[57] ABSTRACT

Methods and systems are disclosed which utilize Little's law to improve cache management in a computer based storage system in which the cache is a partitioned or non partitioned write-back cache. In a first aspect, a method and system for managing a write-back cache in a computer based system to accommodate for deferred write operations is disclosed. The method .and system comprises determining an average cast out delay for a cache entry. In a second aspect the method and system comprises utilizing the average castout delay for estimating the number of dirty cache entries which will be needed by the cache if the write operations rate and the average cast out delay does not change significantly. In a third aspect, a method and system for managing a partitioned and prioritized cache in a computer based system to provide sensitivity to a local maximum is disclosed. The method and system comprises determining an average residency time for a cache entry in the cache and then determining the minimum number of clean pages which should be made available to a particular cache partition based upon that average residency time. In yet another aspect the above aspects can be combined to estimate the minimum requirements on the cache to ensure that a cache management system operates in an efficient manner.

22 Claims, 3 Drawing Sheets

METHOD AND SYSTEM FOR ESTIMATING MINUMUN REQUIREMENTS ON A CACHE IN A COMPUTER BASED STORAGE SYSTEM

FIELD OF THE INVENTION

This invention relates to computer storage of information, and more particularly, to a method for allocating cache storage resources in a multi-echelon staged storage system with reference to prioritized data sets and weighting factors.

BACKGROUND OF THE INVENTION

A computer system typically includes an information processor coupled to a hierarchical staged storage system. The type of storage employed in each staging location relative to the processor is normally determined by balancing requirements for speed, capacity, and cost. Computer processes continually refer to this storage over their executing lifetimes, both reading from and writing to the staged storage system. These references include self-referencing as well as references to every type of other process, overlay or data. It is well known in the art that data storage devices using high-speed random access memory (RAM) can be referenced orders of magnitude faster than high volume direct-access storage devices (DASDs) using rotating magnetic media. Such electronic RAM storage typically relies upon high-speed transfer of electrical charges over short distances while DASDs typically operate mechanically by rotating a data storage position on a magnetic disk with respect to read-write heads. The relative cost per bit of storage for DASD and RAM makes it necessary to use DASD for bulk storage and electronic RAM for processor internal memory and caching.

In a multi-echelon staged memory system, a cache is typically placed between a processor and a larger but slower memory device. For instance, caches employing appropriate devices are found between a processor and main memory and between main memory and a DASD. The caching technique arose from the observation that processors frequently cluster their references in time and space to small sub-sets of all data stored. Thus, if 80% of the immediate references are to 5% of the data space, then storing that popular 5% in cache significantly decreases average reference time because of the substantial speed advantage of cache over main storage. The fundamental caching problem involves establishing an efficient scheme for allocating cache spatial and temporal resources among multiple concurrent processes and their referenced data.

When data referenced by a process is found in the cache memory, it is a "hit" and a copy of the requested data is sent to the requesting process. When the desired data is not found, it is "miss" and the requested data is read from the larger, slower main storage device and transferred both to cache and to the requesting process. When the "miss" data is added to cache, it replaces selected data already in cache. When the replaced data is selected according to the Least Recently Used (LRU) algorithm, the cache is referred to as an LRU cache.

Where long strings of single references are made, such as to consecutive addresses defining a table, the LRU cache efficiency breaks down and the clustering advantage disappears. This is because the data not in cache must be continually staged up from the slower main storage device, resulting in continual cache "flushing". The "set-associative" cache organization scheme is an example known in the art as sometimes useful for reducing the effects of cache flushing by storing sets of sequential data of some length.

In U.S. Pat. No. 4,463,424 ("Method for Dynamically Allocating LRU-MRU Managed MemoryAmong Concurrent Sequential Processes", Jul. 31, 1984), Mattson, et al. disclose a method for dynamic adjustment of LRU cache partition size among a plurality of concurrent processes in a CPU as a direct function of a hit/miss ratio approximated from sampled reference traces. Mattson attempts to use hit/miss ratio to dynamically control cache space and time allocations for improved cache efficiency and to minimize the effects of flushing.

Reference should also be made to Cole, et al. U.S. Pat. No. 4,603,382, "Dynamic Buffer Reallocation", issued Jul. 29, 1986. Cole discloses an arrangement for varying the size of a tape buffer allocated to diverse tape units as a function of hit/miss ratio (data read misses or buffer full). Lastly, reference should be made to Dixon. et al., U.S. Pat. No. 4,489,378, "Automatic Cache Operation", issued Dec. 18, 1984. Dixon discloses a method for varying the amount of data prefetched to cache.

Cache management techniques for preserving process priority that exploit variations in reference patterns while optimizing prioritized partitioned cache performance have been utilized that both preserves priority and maximizes overall cache efficiency are known.

Such a process is described in U.S. Pat. No. 5,394,531 entitled "Dynamic Storage for a Prioritized Cache." This process, although working effectively for its intended purpose, does create some concerns related to proper utilization of the cache. For example, particularly when the cache is a write-back cache, there must be a certain amount of the cache allocated for hits related to the write-back function. In addition, in some environments, this system might settle on a local maximum, ignoring a potentially more desirable global maximum position.

Accordingly, what is needed is a system and method for utilizing such a prioritized cache but at the same time allowing for some minimum cache size requirements for certain applications as well as allowing for a means for detecting these local maximums that may impede the overall performance of the process. The present invention addresses such a need.

SUMMARY OF THE INVENTION

Methods and systems are disclosed which utilize Little's law to improve cache management in a computer based storage system in which the cache is a partitioned or non partitioned cache. In a first aspect, a method and system for managing a cache in a computer based system to accommodate for deferred write operations is disclosed. The method and system comprises determining an average cast out delay for a cache entry.

In a second aspect the method and system comprises utilizing the average castout delay for estimating the number of dirty cache entries which will be needed by the cache if the write operations rate and the average cast out delay does not change significantly.

In a third aspect, a method and system for managing a partitioned and prioritized cache in a computer based system to provide sensitivity to a local maximum is disclosed. The method and system comprises determining an average residency time for a cache entry in the cache and then determining the minimum number of clean pages which should be made available to a particular cache partition based upon that average residency time.

In yet another aspect the above aspects can be combined to estimate the minimum requirements on the cache to ensure that a cache management system operates in an efficient manner.

DESCRIPTION OF THE INVENTION

The present invention relates to an improvement in the computer storage of information. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and systems of the present invention are executable upon a computing system of the type including one or more CPUs, each CPU having a main store, input/output channel, control unit, direct access storage devices (DASD), and other I/O devices coupled thereto. Such a system is described in G. M. Amdhal, et al., U.S. Pat. No. 3,400,371, issued Sep. 3, 1968, and entitled "Data Processing System." The IBM system described therein includes as a resource all of the facilities of either the computing system or the operating system running thereon which are required for the execution of a process. Typical resources include a main store, I/O devices, the CPU, data sets, and control or processing programs. Moreover, said systems are capable of "multiprogramming". This pertains to the concurrent execution of two or more processes by computing system and can be managed on a computer running under IBM's system/370/XA Operating System, as described in IBM Publication GC28-1154, July 1973, and listed in IBM's system/370/XA Bibliography, GC20/0001.

The present invention is intended to be used in an operating system environment containing a conventional data management facility that manages auxiliary storage and provides traditional program compiler and assembly capabilities. The methods of this invention are accordingly described in a pseudo-code flow of control that is similar to the PASCAL language syntax and convention. The pseudo-code syntax and conventions can be readily understood by referring to PASCAL conventions, which may be found in any standard reference work such as Jensen and Wirth, "PASCAL USER MANUAL AND REPORT," 2nd Edition, Copyright 1974 by Springer-Verlag New York, N.Y. The method steps of this invention are illustrated in the tables and drawings in PASCAL-like notation and syntax.

Figure 1:
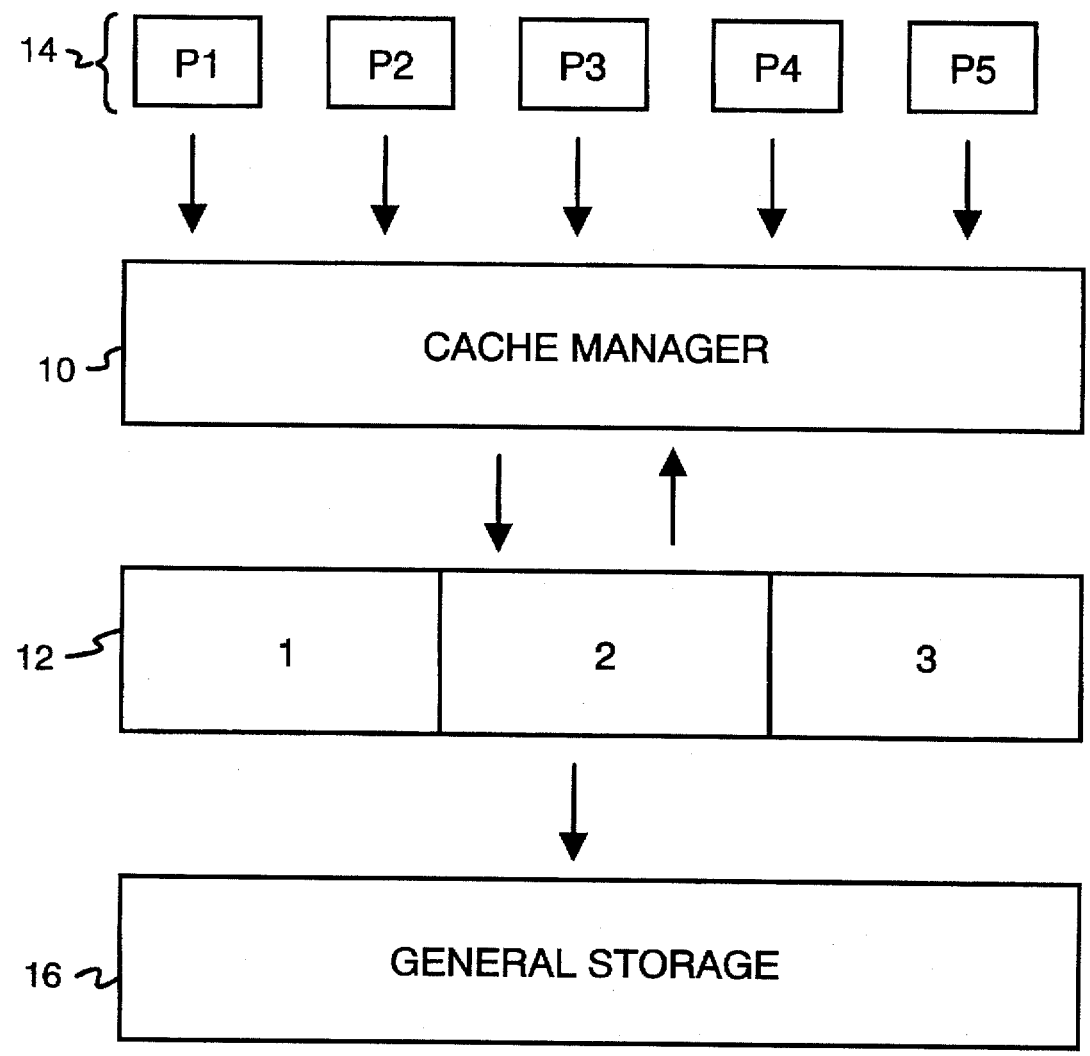
FIG. 1 is a schematic block diagram representative of a partitioned cache storage system.

Referring to FIG. 1, the present invention can be applied generally to a cache storage system where a cache manager arranges for a cache to be partitioned into a plurality of cache pools for sharing between a plurality of competing processes. Between the cache manager and the processes, there will usually be another level of logic in the form of a file management system or a data base management system (DBMS), not shown. However, it is assumed herein that the reader is familiar with the use of and the conventional management of cache memory for speeding access to data normally held in general (i.e. main or backing storage). Accordingly, no further description of this general background is given herein.

The cache storage system can form part of a data processing system. The data processing system can be a mainframe computer system, a computer workstation, or any other data processing system in which a plurality of processes compete for use of a cache storage. The following description concentrates on the application, in accordance with the present invention.

A system has been utilized in a facility which provides for a non-volatile partitioned cache as described in above mentioned U.S. Pat. No. 5,394,353. A system in accordance with this patent will make use of such a cache to dynamically evaluate hit rate performance, and using this information to meet customer supplied performance objectives.

The above-identified patent describes a technique for prioritizing a cache usage, whereby a higher priority use will have freer access to a greater portion of the cache than a lower priority user. Accordingly, a higher priority user gets more than its "fair share" of the cache and a lower priority gets less than its fair share of the cache. This is accomplished by dividing the cache into a plurality of partitions. Thereafter, a process or algorithm is utilized to determine what sizes of partitions need to be assigned to each of the subcaches in order to maintain the prioritization objectives as well as maximize the number of hits in the cache. Although this system works effectively to optimize the hit ratio of the cache, it is possible that there may be some adjustments necessary for best performance in certain environments.

Accommodating Deferred Writes

In a non-volatile partitioned cache it is possible to redistribute cache resources based upon priority and/or performance of the data utilizing the various cache partitions. However, write I/Os make use of cache resources in a very different manner than do reads (and typically get much higher hit ratios). It is very important to have cache capacity available for new writes (as otherwise the writer is forced to delay until the write completes to DASD). However, there is a desire not to arbitrarily tie up cache resources which may not be needed for this purpose.

It is well known, for example in a system that utilizes a write-back cache when a write operation is performed, that a user is able to continue operating after writing to the cache. If there is adequate space in the cache tow rite, then the user will then be able to continue operating because the cache can be destaged at the same time. If, however, there is no room in the cache for the user tow rite back, then the user will not be able to continue until a destage operation occurs. This destaging operation if performed before the write back can cost as much as miss to the cache in terms of performance of the system. Thus unless a portion of the cache is allocated for these deferred writes the overall operation of the system can be adversely affected.

Increasing Sensitivity to Global Maxima

In addition, in a partitioned cache (whether volatile or non-volatile), when redistributing cache resources it is desirable to provide enough cache resources to the poorly performing partitions such that should their hit ratios improve, that the improvement will be measurable the next time that they are evaluated; conversely, it is undesirable to allocate excess cache resources to cache partitions with poor hit rate performance.

There is a chance that through the utilization of the process described in U.S. Pat. No. 5,394,353, local maximum of the cache size may be encountered rather than a global maximum. To more clearly describe the concept of a local maximum relative to a global maximum, refer now to the following analogy. A mountain may have plateaus or the like therewithin before reaching the peak, these plateaus would be local maximum, while the peak of the mountain would be the global maximum.

Accordingly, it is important when managing the cache, for the "peak" or largest possible cache size to be determined rather than some plateau or smaller cache size. Therefore, it was determined that it is possible when utilizing the prioritization scheme of the above-identified patent to settle on a local maximum of cache size, rather than on the more desirable global maximum.

Therefore, the present invention provides two features: (1) it accommodates deferred write operations in a write back cache, and (2) it has increased sensitivity to global maximum over other known cache management systems.

Applicant has discovered by applying Little's law to a write-back cache, a method and system can be provided which has sensitivity to cache requirements. To more specifically describe the present invention, refer now to the following discussion.

The generalized equation for Little's law is shown below.

$$N = \alpha \times t$$

where N is the number of entries, $\alpha$ is the arrival rate of the unit and t is the average residency time for each unit. As an example, if the number of available seats for patrons (N) are in a restaurant and the time (t) that an average patron is seated is known, one could determine by formulation the rate ($\alpha$) at which waiting patrons are seated as N/t. Hence, it is seen that under Little's law, as long as two of the factors are known, the third factor can be derived.

Through the application of the principles of Little's law for accommodating deferred writes to the cache and for providing increased sensitivity to a global maximum, a cache management system has improved performance over known cache management systems. The present invention will be more specifically described by referring now to FIGS. 2 and 3 in conjunction with the following discussion.

Accommodating Deferred Writes

The number of dirty pages needed by each partition to accommodate writes can be determined by Little's Law effectively. However, in order for Little's Law to be able to be used, the average cast-out delay needs to be known. Cast-out delay is not related to the hit ratio characteristics of the cached data, but rather is determined by things such as device delay and processor utilizations. However, the castout delay can also be determined by (a different application of) Little's Law. Thus, in one aspect, the present invention is a method whereby Little's Law is utilized to both predict the average destage delay as well as to predict number of dirty cache pages which will be required by each cache partition.

Figure 2:
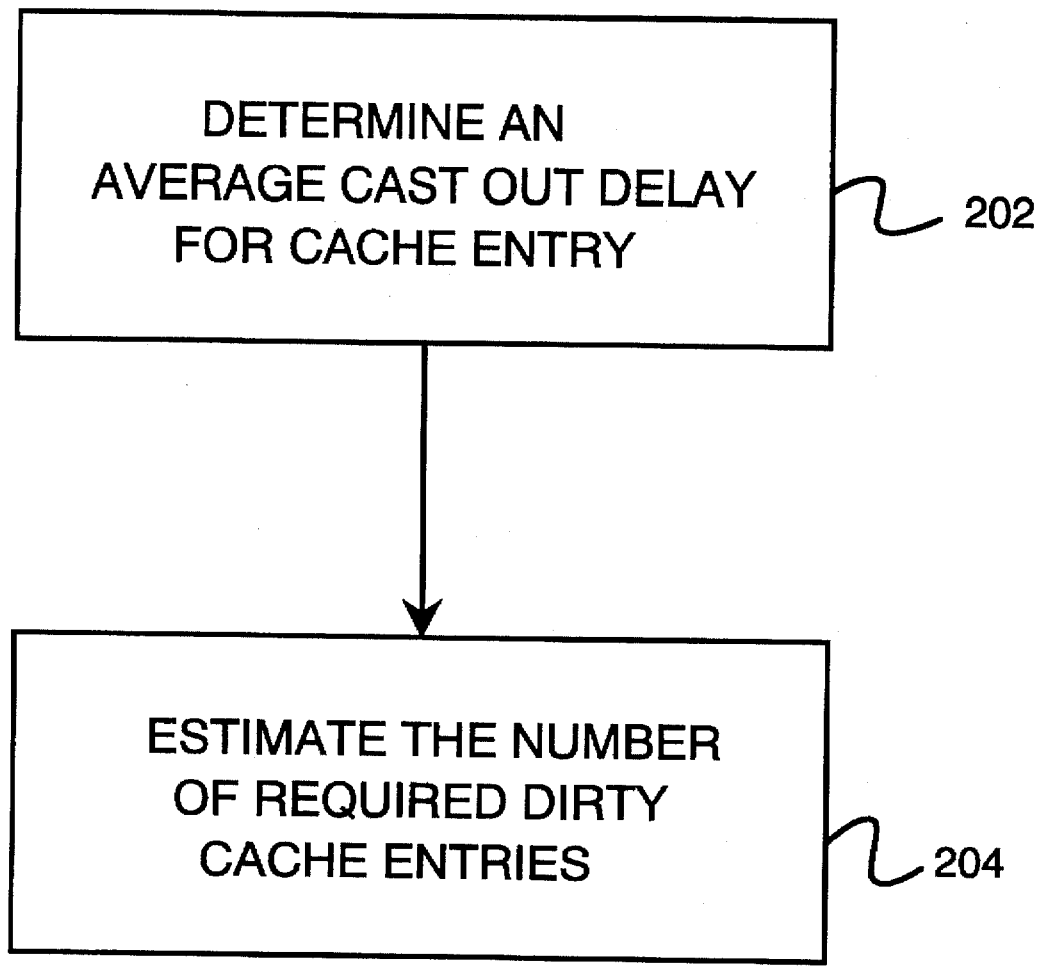
FIG. 2 is a flow chart of the application of Little's law to the deferred write operations in a write-back cache.

Referring now to FIG. 2, what is shown is a flow chart of the application of Little's law to the deferred writes in a write back cache. As is seen, first an average cast out delay for a cache entry is determined via step 202. In a preferred embodiment, the average cast-out (or destage) delay ($t_{co}$), can be computed as follows:

$$t_{co} = \frac{Dirty\_Cache\_Size}{(W/S) \times (1-Dirty\_Write\_Hit\_Ratio)}$$

where the Dirty_Cache_Size is the number of cache entries which are dirty at the time of the most recent measurement, W/S is the number of writes per second, and the Dirty_Write_Hit_Ratio is the fraction of Writes that are to a datum which is not only already in the cache, but was already a dirty cache entry.

The next step 204 estimates the number of dirty cache entries (d) which will be needed by a particular partition (i) if the write rate and the average cast-out delay do not change significantly in the near future. In a preferred embodiment, the estimate of the dirty cache entries:

$$d_i = t_{co} \times W/S_i \times (1-Dirty\_Write\_Hit\_Ratio_i)$$

where the subscript i refers to the single cache partition i.

Increased Sensitivity to Global Maxima

The number of clean pages needed by each partition to accommodate hit rate improvements in the near future can also be estimated with Little's Law. By determining the average amount of time that each cache entry resides within the entire cache (taken as a whole), an estimate as to the number of cache entries which would be required by each individual cache partition, were it to achieve the average hit ratio, can be derived. Although, it is not always desirable to allocate this number of cache entries to each partition, it does serve as an indicator which can be used as a baseline from which the actual number of cache entries to be allocated is to be determined. The actual number of cache entries allocated for this purpose should be influenced by the relative priority importance of the particular cache partition. Given a set of n priority weight values ($w_i$), such that the sum of the priority weights adds up to 1, the preferred number of cache entries can be normalized by the relative priority weight (i.e., $n \times w_i$).

Figure 3:
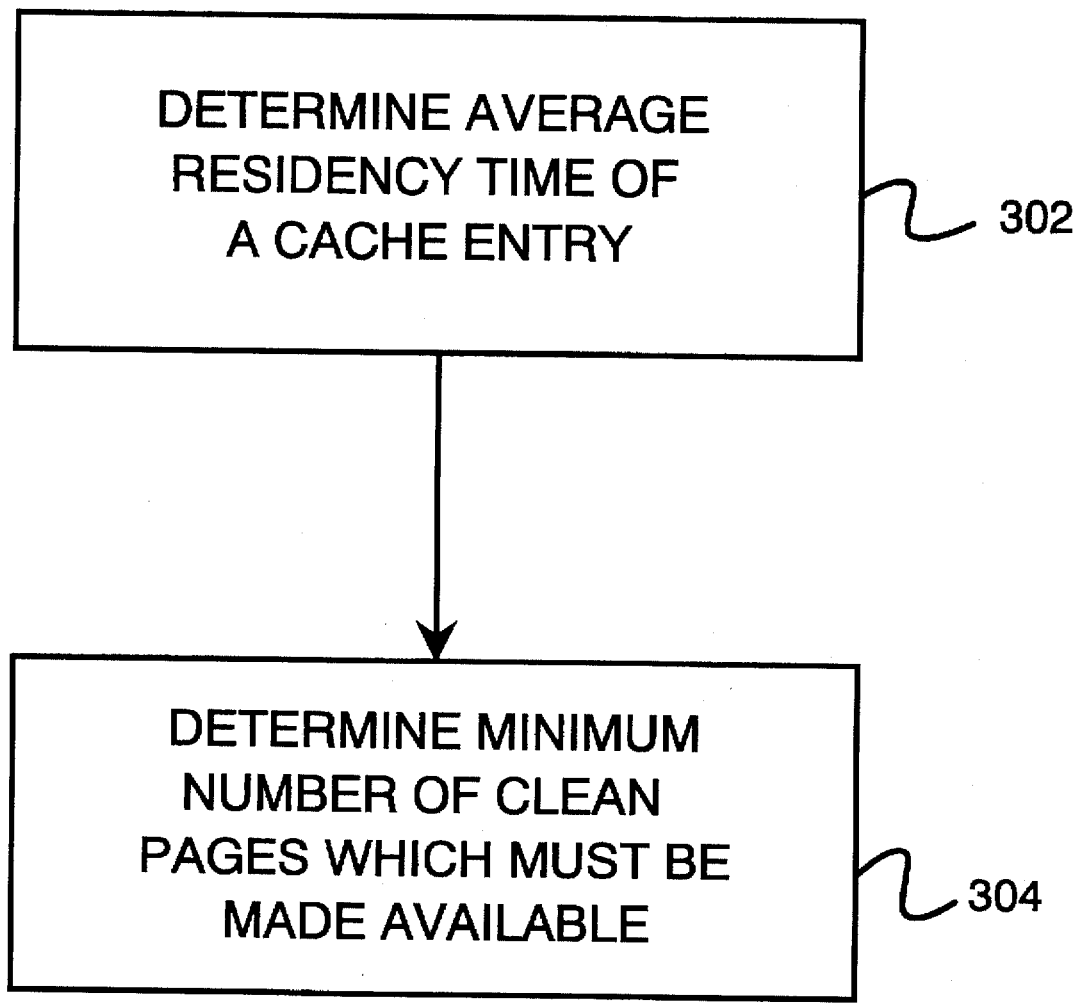
FIG. 3 is a flow chart showing a process for providing increased sensitivity to a global maximum in a partitioned cache.

Referring now to FIG. 3, what is shown is a flow chart of a method for providing increased sensitivity to a global maximum in a cache. Accordingly, first an average residency time that an entry resides in a cache is determined, via step 302. A formula in accordance with a preferred embodiment for providing the average residency time for a cache entry is shown below.

$$t = \frac{Cache\_Size}{I/O\ Rate \times (1\text{-hit ratio})}$$

In a preferred embodiment, the residency time would be determined from the following formula, where the I/O rate is the input/output rate for all of the cache partitions.

Referring back to FIG. 3, from that average, the minimum number of clean pages should be made available via step 304. Thus, in a preferred embodiment, the process for determining the number of clean pages (c) which should be made available is:

$$c_i = (t \times I/O\_RATE_i \times (1\text{-hit\_ratio}) \times (n \times w_i)$$

where I/O_Rate refers to the I/O rate for the all of the cache partitions together, and the I/O_Rate$_i$ refers to the I/O rate for the $i^{th}$ partition only.

Accordingly a system and method in accordance with the present invention provides for optimization of write performance in the presence of a write back cache and also has sensitivity to global maxima vs local maxima in maximizing hit rate performance (while still addressing performance priority specifications). In a preferred embodiment, the application of Little's law to accommodate deferred writes would be mandatory, and the application of Little's law to local maximums would be suggestive.

It should also be understood that although the present invention has been discussed in the context of a prioritized partitioned cache, the cache does not have to be partitioned to make use of the present invention. For example, if the cache is a write back cache, the amount of the cache that must be allocated for deferred writes can easily be determined.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing a cache in a computer based system to accommodate for deferred write operations, the deferred writes being performed at a known rate, the method comprising the steps of:

a) determining an average cast out delay for a cache entry; and b) estimating the number of dirty cache entries which will be needed by the cache if the known write operations rate and the average cast out delay does not change significantly.

2. The method of claim 1 in which the cache is divided into partitions and the partitions are prioritized in a predetermined manner, wherein a higher priority user will have freer access to a greater portion of the cache than a lower priority user.

3. The method of claim 2 in which the average cast out delay determining step (a) further comprises the step of:

determining the average cast out delay ($t_{co}$) in accordance with the following:

$$t_{co} = \frac{Dirty\_Cache\_Size}{(W/S) \times (1\text{-}Dirty\_Write\_Hit\_Ratio)}$$

where the Dirty_Cache_Size is the number of cache entries which are dirty at the time of the most recent measurement, W/S is the number of writes per second, and the Dirty_Write_Hit_Ratio is the fraction of Writes that are to a datum which is not only already in the cache, but is already a dirty cache entry.

4. The method of claim 3 in which the estimating step b) comprises the step of estimating the number of cache entries needed dirty cache entries ($d_i$) in accordance with the following:

$$d_i = t_{co} \times W/S_i \times (1\text{-}Dirty\_Write\_Hit\_Ratio_i)$$

where the subscript i refers to the single cache partition i.

5. The method of claim 4 in which the average residency time (t) determining step further comprises the step of determining an average residency time in accordance with the following:

$$t = \frac{Cache\_Size}{I/O\ Rate \times (1\text{-}hit\ ratio)}$$

where the I/O rate is the input/output rate for all of the cache partitions.

6. A method for managing a cache in a computer based system to provide sensitivity for a global maximum, the cache being divided into a plurality of partitions, the partitions be prioritized in a predetermined manner, the method comprising the steps of:

(a) determining an average residency time for a cache entry in the cache; and (b) determining the minimum number of clean pages which should be made available to a particular user based upon the average residency time of a cache entry.

7. The method of claim 6 in which the minimum number of clean pages determining step further comprises the step of determining the minimum number of clean pages (c) which should be made available in accordance with the following:

$$c_i = (t \times I/O\_RATE_i \times (1\text{-}hit\_ratio) \times (n \times w_i)$$

where I/O_Rate refers to the I/O rate for the all of the cache partitions together, and the I/O_Rate$_i$ refers to the I/O rate for the $i^{th}$ partition only.

8. A system for managing a cache in a computer based system to accommodate for deferred write operations, the deferred writes being performed at a known rate, the system comprising:

means for determining an average cast out delay for a cache entry; and means responsive to the average cast out determining means for estimating the number of dirty cache entries which will be needed by the cache if the known write operations rate and the average cast out delay does not change significantly.

9. The system of claim 8 in which the average cast out delay determining means further comprises means for determining the average cast out delay ($t_{co}$) in accordance with the following:

$$t_{co} = \frac{Dirty\_Cache\_Size}{(W/S) \times (1\text{-}Dirty\_Write\_Hit\_Ratio)}$$

where the Dirty_Cache_Size is the number of cache entries which are dirty at the time of the most recent measurement, W/S is the number of writes per second, and the Dirty_Write_Hit_Ratio is the fraction of Writes that are to a datum which is not only already in the cache, but is already a dirty cache entry.

10. The system of claim 9 in which the estimating means comprises means for estimating the number of cache entries needed dirty cache entries ($d_i$) in accordance with the following:

$$d_i = t_{co} \times W/S_i \times (1\text{-}Dirty\_Write\_Hit\_Ratio_i)$$

where the subscript i refers to the single cache partition i.

11. The system of claim 8 in which the cache is divided into partitions and the partitions are prioritized in a predetermined manner, wherein a higher priority user will have freer access to a greater portion of the cache than a lower priority user.

12. A system for managing a cache in a computer based system to provide sensitivity for a global maximum, the cache being divided into a plurality of partitions, the partitions be prioritized in a predetermined manner, the system comprising:

means for determining an average residency time for a cache entry in the cache; and means responsive to average residency time determining means for determining the minimum number of clean pages Which should be made available to a particular user based upon the average residency time of a cache entry.

13. The system of claim 12 in which the average residency time (t) determining means further comprises determining an average residency time in accordance with the following:

$$t = \frac{Cache\_Size}{I/O\ Rate \times (1\text{-hit ratio})}$$

where the I/O rate is the input/output rate for all of the cache partitions.

14. The system of claim 13 in which the minimum number of clean pages determining means further comprises means for determining the minimum number of clean pages (c) which should be made available in accordance with the following:

$$c_i = (t \times I/O\_RATE_i \times (1\text{-hit\_ratio}) \times (n \times w_i)$$

where I/O__Rate refers to the I/O rate for the all of the cache partitions together, and the I/O__Rate$_i$ refers to the I/O rate for the $i^{th}$ partition only.

15. A method for managing a cache in a computer based system for estimating minimum size requirements, the cache being divided into a plurality of partitions, the partitions be prioritized in a predetermined manner, the method comprising the steps of:

a) determining an average cast out delay for a cache entry;
   b) estimating the number of dirty cache entries which will be needed by the cache if a known write operations rate and the average cast out delay does not change significantly;
   (c) determining an average residency time for a cache entry in the cache; and
   (d) determining the minimum number of clean pages which should be made available to a particular user based upon the average residency time of a cache entry.

16. The method of claim 15 in which the average cast out delay determining step (a) further comprises the step of:

determining the average cast out delay ($t_{co}$) in accordance with the following:

$$t_{co} = \frac{Dirty\_Cache\_Size}{(W/S) \times (1\text{-Dirty\_Write\_Hit\_Ratio})}$$

where the Dirty__Cache__Size is the number of cache entries which are dirty at the time of the most recent measurement, W/S is the number of writes per second, and the Dirty__Write__Hit__Ratio is the fraction of Writes that are to a datum which is not only already in the cache, but is already a dirty cache entry.

17. The method of claim 16 in which the estimating step b) comprises the step of estimating the number of cache entries needed dirty cache entries ($d_i$) in accordance with the following:

$$d_i = t_{co} \times W/S_i \times (1\text{-Dirty\_Write\_Hit\_Ratio}_i)$$

where the subscript i refers to the single cache partition i.

18. The method of claim 15 in which the average residency time (t) determining step (c) further comprises the step of determining an average residency time in accordance with the following:

$$t = \frac{Cache\_Size}{I/O\ Rate \times (1\text{-hit ratio})}$$

where the I/O rate is the input/output rate for all of the cache partitions.

19. The method of claim 18 in which the minimum number of clean pages (c) determining step (d) further comprises the step of determining the minimum number of clean pages which should be made available in accordance with the following:

$$c_i = (t \times I/O\_RATE_i \times (1\text{-hit\_ratio}) \times (n \times w_i)$$

where I/O__Rate refers to the I/O rate for the all of the cache partitions together, and the I/O__Rate$_i$ refers to the I/O rate for the $i^{th}$ partition only.

20. A computer readable medium containing program instructions for managing a cache in a computer based system to accommodate for deferred write operations, the deferred writes being performed at a known rate, the program instructions for:

a) determining an average cast out delay for a cache entry; and
   b) estimating the number of dirty cache entries which will be needed by the cache if the known write operations rate and the average cast out delay does not change significantly.

21. A computer readable medium containing program instructions for managing a cache in a computer based system to provide sensitivity for a global maximum, the cache being divided into a plurality of partitions, the partitions be prioritized in a predetermined manner, the program instructions for:

(a) determining an average residency time for a cache entry in the cache; and
   (b) determining the minimum number of clean pages which should be made available to a particular user based upon the average residency time of a cache entry.

22. A computer readable medium containing program instructions for managing a cache in a computer based system for estimating minimum size requirements, the cache being divided into a plurality of partitions, the partitions be prioritized in a predetermined manner, the program instructions for:

a) determining an average cast out delay for a cache entry;
   b) estimating the number of dirty cache entries which will be needed by the cache if a known write operations rate and the average cast out delay does not change significantly;
   (c) determining an average residency time for a cache entry in the cache; and
   (d) determining the minimum number of clean pages which should be made available to a particular user based upon the average residency time of a cache entry.

* * * * *